March 16, 1937. H. E. LINDEN 2,073,801
RENEWABLE CUTTING EDGE
Filed Oct. 8, 1934
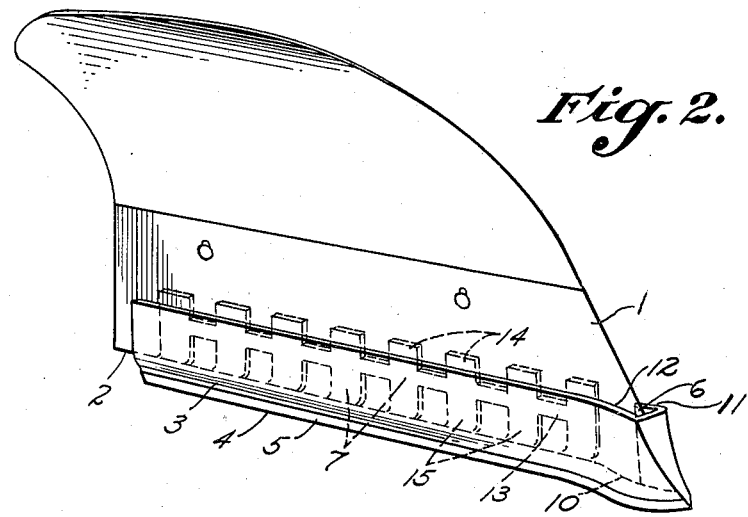
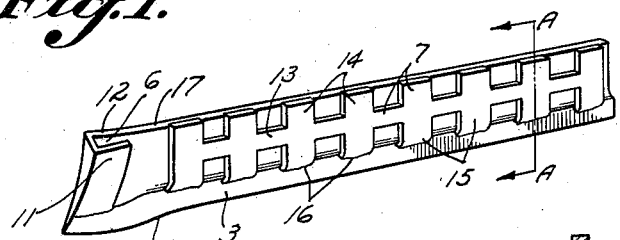
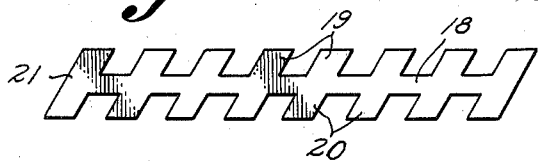 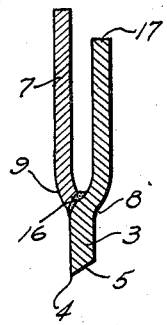
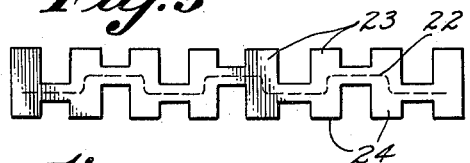
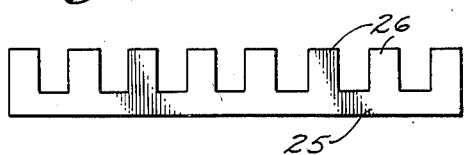
INVENTOR.

Patented Mar. 16, 1937

2,073,801

UNITED STATES PATENT OFFICE 2,073,801

RENEWABLE CUTTING EDGE

Herbert E. Linden, Beverly Hills, Calif.

Application October 8, 1934, Serial No. 747,364

8 Claims. (Cl. 97—125)

This invention relates to renewable cutting edges for agricultural and earth-working implements and particularly for plowshares.

Objects of my invention are: to provide a renewable cutting edge which can be quickly attached to an implement without use of special tools; to provide an edge that will stay on the implement without special fastening means; to provide an edge that is strong and durable; to make an edge that will have low friction in passing through earth; and to provide an edge that can be cheaply manufactured.

I attain these objects in a manner that will be clear from a consideration of the following description taken in connection with the accompanying drawing, of which:

Fig. 1 is a perspective view of one form of my renewable cutting edge as viewed from beneath.

Fig. 2 is a perspective view of my renewable cutting edge on a plowshare, as viewed from the side and above.

Fig. 3 is a sectional view of the edge of Fig. 1, taken in the plane A—A.

Fig. 4 is a view of an alternative form of gripping element employed on the renewable cutting edge.

Fig. 5 is a view of an alternative form of gripping element employed on the renewable cutting edge.

Fig. 6 is a view of an alternative form of gripping element employed on the renewable cutting edge.

By way of illustration, I have shown my renewable cutting edge attached to a plowshare 1 of conventional design. It is understood that, by changing proportions and shapes, my invention can be applied to lister ploughs, cultivators, hillside ploughs, etc. The share 1 has a cutting edge 2 as an integral part thereof. In use this edge, if unprotected, wears to such an extent that it frequently requires resharpening which is expensive and often results in an inferior plowshare because of distortion of the share. My renewable cutting edge can be attached to either an old or a new plowshare and when it becomes worn it is simply thrown away and replaced by another. The cost of the renewable cutting edge is less than the cost of resharpening would have been over a period equal to the life of the edge.

In Figs. 1 to 3, inclusive, I have shown one form of my renewable cutting edge which comprises an elongated blade 3 which preferably extends the entire length of the plowshare. This blade is formed with a cutting edge 4 which is the line of intersection of the under side of blade 3 and the bevel 5. The blade is at the front bent around to form a socket 6 adapted to receive the point of the plowshare. Fastened to the blade 3, preferably by welding, is a single elongated gripping element 7 extending longitudinally of the blade. The gripping element 7 is spaced from the upper portion of the blade 3 to provide for retention therebetween of the plowshare. This is accomplished by bending the blade 3 along a longitudinal line at 8 and the gripping element 7 along a line at 9 to form a longitudinal groove or channel between the two into which the lower edge 2 of the plowshare is fitted. The common plowshare is curved at 10 near the front end, and I configurate my blade 3 and gripping element 7 to conform to this peculiar shape. When the plowshare is inserted in the groove between gripping element 7 and the opposing portion of the blade 3 with the point in socket 6, the gripping element 7 deflects somewhat to accommodate the usual tapered form of the plowshare edge, and when the plowshare is fully inserted it will be found to be held tightly by friction between the gripping element and the blade. If the renewable cutting edge is not forced completely onto the plowshare, the edge will in use work on of itself because of the pressure of the earth against it. The frictional gripping of the share by the gripping element and the blade is so great that a hammer must be used forcefully to remove the edge. While the socket 6 may be formed so that it is non-gripping and simply keeps the edge from slipping longitudinally backward on the share, it may also be formed so that it too grips the share. This is accomplished by bending the portion 11 close enough to the opposing portion 12 of the blade that the plowshare in slipping into the socket is required to spread these portions apart. The socket 6 may, of course, be formed by welding a suitably shaped piece onto blade 3 instead of by bending the blade.

It will be observed that the blade 3 has its beveled edge 5 on the upper side of the plow as it works in the ground. The purpose of this is to assure that the edge is self-sharpening. It is found that the wearing of the edge comes on the under side and that as the edge wears back and bevels the under side, these two bevels cooperate to make a new edge which is always sharp.

One of the essential features of my invention is the form and character of the gripping element 7. While it would be possible to form out of one piece a complete cutting edge having as an integral part thereof a gripping element and possessing some of the advantages of mine, it is not a desirable construction. Making the blade in one piece and the gripping element in another as I do, I can use a steel for the blade that can be hardened and will wear long, while for the gripping element I can use a cheaper softer steel which cannot be so greatly hardened, which will not be brittle and which can deflect to assume the contour of the plowshare.

I make my gripping element as a single piece in order to have strength, and to effect cheapness of assembly because of only two parts to handle, and also to decrease friction of the edge in passing through the ground. Preferably I form my single gripping element with a continuous longitudinal strip 13 running the entire length of the element and having transverse extensions thereon for purposes to be presently set forth. The continuous strip, while not absolutely necessary, is of great advantage in providing a narrow continuous metal sled on which the earth bears and largely prevents the friction which would otherwise develop due to earth scraping against the edges of the many projecting tabs. It is understood that this continuous strip of metal need not longitudinally extend in a straight line; it may take a zigzag course as in Fig. 5. The essential thing is that there be an unbroken line of metal, however crooked, extending longitudinally of the edge from one end to the other of the gripping element in order that at every point longitudinally along the gripping element there shall be some support to keep individual portions from sinking into the earth. Of course, the gripping element might be made in the form of a rectangular sheet, but it is found that this construction results in too much friction because of the relatively large surface rubbing on the ground. It is for this reason that I employ a gripping element with many open spaces and little surface but with a continuous strip of metal running from front to rear.

In the form of gripping element shown in Fig. 1, I provide extensions of the continuous strip transverse to the strip 13 in the form of tabs 14 extending upwardly and tabs 15 extending downwardly therefrom at intervals along its length. The tabs 15 are welded at points 16 to the blade 3. The tabs 14 extend above the top 17 of blade 3 in order to make it easy to fit the renewable cutting edge onto a plowshare which may be laying on the ground. To perform this operation the tabs 14 are hooked under the share and the new edge is simply forced on. Without tabs 14 projecting beyond top 17 to act as a guide it is difficult to enter the share into the groove of the renewable edge.

The gripping element preferably extends longitudinally nearly the entire length of the renewable edge so as to firmly grip the plowshare from front to rear. This is not essential, however, and I may employ a gripping element of only sufficient length to assure that the renewable edge remains tightly wedged on the share. In this connection, I have found that it is impracticable to employ a gripping element extending longitudinally of the blade for less than one-third its length. In the case of a long gripping element I may carry the gripping element 7 over to join the portion 11 of the blade.

While I have shown in Figs. 1 to 3 inclusive a gripping element having transverse extensions 14 and 15 which extend substantially perpendicularly from the edge of the blade and from the continuous strip 13, I can also form the gripping element as in Fig. 4. Here I have a continuous longitudinal strip 18 with transverse extensions 19 upward and transverse extensions 20 downward therefrom. In this design, however, the transverse extensions make a steep slanting angle with continuous strip 18, and the element is attached to the blade 3 in such manner that the end 21 is toward the front of the renewable edge. This results in the transverse extensions being set in about the same direction as the line of travel of the plow through the ground and friction is reduced somewhat. The element is welded at the lower ends of extensions 20 to blade 3.

Fig. 5 illustrates another alternative form of gripping element in which the continuous strip 22 does not lie wholly in a longitudinal direction. The course of the strip 22 is indicated by the dotted line. Transverse extensions 23 extend upwardly from the continuous strip and other transverse extensions 24 extend downwardly therefrom. The lower ends of extensions 24 are welded to blade 3.

It is understood that the continuous strip may occupy any position with respect to the transverse extensions if there are such or may occupy any position with respect to the edge of blade 3. In Fig. 6 I show the continuous strip 25 at the bottom of the gripping element with transverse extensions 26 extending upwardly therefrom. This gripping element is attached to blade 3 by welding the lower edge of strip 25 to the blade.

While in the drawing I have shown the transverse extensions of the gripping element uniformly spaced adong the longitudinal strip, this need not be. There may be any number of transverse extensions, oriented in any manner with respect to the longitudinal strip and spaced in any manner along its length.

It will be understood, of course, that there are many other designs for the gripping element as well as other variations in construction or arrangement which might be made by those skilled in the art without departing from the spirit of the invention or the scope of the appended claims.

What I claim and desire to secure by Letters Patent is:

1. A renewable cutting edge for an earth-working implement including an elongated blade and means carried by said blade and cooperating therewith to frictionally retain the renewable cutting edge on said implement which includes a continuous metal strip extending longitudinally of said blade and spaced therefrom and transverse extensions on said strip.

2. A renewable cutting edge for a plowshare including an elongated blade and a gripping element carried by said blade and spaced therefrom consisting of a continuous metal strip extending longitudinally of said blade with transverse extensions on said strip at intervals along its length, said gripping element and said blade being adapted to frictionally engage the two sides of said plowshare to retain the renewable cutting edge thereon.

3. A renewable cutting edge for a plowshare including an elongated blade, means on the front of said blade adapted to receive the point of said plowshare, and a gripping element carried by said blade and spaced therefrom consisting of a continuous metal strip extending longitudinally of said blade and a plurality of transverse extensions therefrom, said gripping element and said blade being adapted to frictionally engage the two sides of said plowshare to retain the renewable cutting edge thereon.

4. A renewable cutting edge for a plowshare including an elongated blade having a cutting edge, and a gripping element carried by said blade and spaced therefrom consisting of a continuous metal strip extending longitudinally of said blade and a plurality of transverse extensions from said strip, said gripping element extending farther from said cutting edge than does said blade, said gripping element and said blade being adapted to frictionally engage the two sides of said plowshare to retain the renewable cutting edge thereon.

5. A renewable cutting edge for an earth working implement including an elongated blade, and a single metal piece carried by said blade and spaced therefrom and being adapted to cooperate with said blade in frictionally retaining the renewable cutting edge on said implement, said metal piece being in the shape of a continuous strip extending longitudinally of said blade and having extensions transverse to said strip.

6. A renewable cutting edge for a plowshare including an elongated metal blade, and a single piece of metal softer than that of said blade being carried by said blade and spaced therefrom and being adapted to cooperate with said blade in frictionally retaining the renewable cutting edge on said plowshare, said metal piece being in the shape of a continuous strip extending longitudinally of said blade and having extensions transverse to said strip.

7. A renewable cutting edge for an earth working implement including an elongated blade, and a gripping element carried by said blade and spaced therefrom and being adapted to cooperate with said blade in frictionally retaining the renewable cutting edge on said implement, said gripping element comprising a continuous strip extending longitudinally of said blade for at least one-third the length of said blade and having extensions transverse to said strip.

8. A renewable cutting edge for a plowshare comprising an elongated blade, means on the front of said blade adapted to receive the point of said plowshare, and a single metal piece carried by said blade and spaced therefrom and being in the shape of a continuous strip extending longitudinally of said blade with extensions transverse to said strip, said metal piece and said blade being adapted to engage the lower and upper sides, respectively, of said plowshare to frictionally retain the renewable cutting edge thereon.

HERBERT E. LINDEN.